US010740646B2

(12) United States Patent
Yeoh et al.

(10) Patent No.: US 10,740,646 B2
(45) Date of Patent: Aug. 11, 2020

(54) PROGRAMMABLE CELLULAR AUTOMATA FOR MEMORY SEARCH, RECALL, SIMULATION, AND IMPROVISATION

(71) Applicant: The Aerospace Corporation, El Segundo, CA (US)

(72) Inventors: Terence S. Yeoh, Pasadena, CA (US); Nehal Desai, El Segundo, CA (US)

(73) Assignee: The Aerospace Corporation, El Segundo, CA (US)

( * ) Notice: Subject to any disclaimer, the term of this patent is extended or adjusted under 35 U.S.C. 154(b) by 216 days.

(21) Appl. No.: 15/798,020

(22) Filed: Oct. 30, 2017

(65) Prior Publication Data
US 2019/0130207 A1 May 2, 2019

(51) Int. Cl.
G06K 9/46 (2006.01)
G06N 3/04 (2006.01)
G06K 9/62 (2006.01)
G06N 3/08 (2006.01)
G06K 9/52 (2006.01)

(52) U.S. Cl.
CPC .......... *G06K 9/4628* (2013.01); *G06K 9/527* (2013.01); *G06K 9/6219* (2013.01); *G06K 9/6247* (2013.01); *G06K 9/6274* (2013.01); *G06N 3/04* (2013.01); *G06N 3/084* (2013.01); *G06K 2009/6213* (2013.01)

(58) Field of Classification Search
None
See application file for complete search history.

(56) References Cited

U.S. PATENT DOCUMENTS

| 6,393,154 B1* | 5/2002 | Lafe | H04N 19/172 |
| | | | 375/E7.044 |
| 2010/0027895 A1* | 2/2010 | Noguchi | G06K 9/4671 |
| | | | 382/224 |

OTHER PUBLICATIONS

RPSContest website available at http://www.rpscontest.com/ (last accessed May 1, 2018).

* cited by examiner

*Primary Examiner* — Mark Roz
(74) *Attorney, Agent, or Firm* — LeonardPatel PC; Michael Aristo Leonard, II; Sheetal Suresh Patel (57) ABSTRACT

An architecture and process are provided that encodes information into a cellular automata memory structure such that it can be recalled utilizing unique memory anchors (engrams) in a manner that both identifies and relates each piece of information relative to other data points. The automata may be individually programmable with a limited, local ruleset that activates other cellular automata based on prior patterns that were fed into the array. Deep Learning Neural Network (DLNN) systems may be probed to understand what discriminators are being used to classify the data, which is not possible with conventional DLNN techniques.

26 Claims, 8 Drawing Sheets

PROGRAMMABLE CELLULAR AUTOMATA FOR MEMORY SEARCH, RECALL, SIMULATION, AND IMPROVISATION

FIELD

The present invention generally pertains to artificial intelligence (AI), and more specifically, to an architecture and process that encodes information into a cellular automata memory structure such that it can be recalled utilizing unique memory anchors (engrams) in a manner that both identifies and relates each piece of information relative to other data points.

BACKGROUND

Deep Layer Neural Networks (DLNNs) utilize standard feedforward and back propagation processes to take information from datasets (usually visual) and classify them in a set of predefined bins utilizing both unsupervised and supervised learning. However, DLNN systems are so complex that it is not apparent what details in the data are being used to classify the image, and subtle changes in data values can drastically change the classification. This reductionist "black box" approach also does not enable new or creative datasets to be developed based on prior datasets. Accordingly, an improved approach may be beneficial.

SUMMARY

Certain embodiments of the present invention may be implemented and provide solutions to the problems and needs in the art that have not yet been fully solved by conventional artificial intelligence (AI) techniques. For example, some embodiments of the present invention pertain to an architecture and process that encodes information into a cellular automata memory structure such that it can be recalled utilizing unique memory anchors (engrams) in a manner that both identifies and relates each piece of information relative to other data points. This recall mechanism may enable multiple layers of pattern recognition, which enables mammalian neocortex-like function, extends the ability to generate new datasets, and creates realistic simulations and predictions of future patterns based on prior learned datasets. These novel advancements are steps towards strong AI. These processes have been applied on visual datasets and have shown the basic mechanisms of recall, memory engrams, and new data.

In an embodiment, a computer program is embodied on a non-transitory computer-readable medium. The program is configured to cause at least one processor to break an image down into a plurality of frames using a two-dimensional (2D) wavelet transform, thereby reducing data of the image into a plurality of smaller datasets associated with the plurality of frames. The program is also configured to cause the at least one processor to generate a plurality of cellular automata that regenerate an initial dataset by feeding the plurality of frames through the plurality of cellular automata twice in a sequence. The computer program is further configured to cause the at least one processor to generate a unique hash for the image and generate one or more new images by putting multiple stacks of frames for multiple images in a same array due to imperfect recall.

In another embodiment, a computer-implemented method includes generating a plurality of cellular automata, by a computing system, that regenerate an initial dataset by feeding a plurality of frames derived from an image through the plurality of cellular automata twice in a sequence. The computer-implemented method also includes generating, by the computing system, a unique hash for the image.

In yet another embodiment, a computer-implemented method includes generating a unique hash for an image, by a computing system. The computer-implemented method also includes generating one or more new images, by the computing system, by putting multiple stacks of frames for multiple images in a same array due to imperfect recall.

In still another embodiment, a computer-implemented method of generating a unique hash for an image includes identifying a first frame in a sequence of a plurality of frames representing the image using a unique ID (UID), by the computing system. The computer-implemented method also includes using the UID as a seed to generate a random number for a second frame in the sequence and appending the random number to the UID in the hash to identify the second frame of the plurality of frames, by the computing system. The computer-implemented method further includes repeating the generation of new random numbers using the UID as a seed and appending of the new random number to the hash to identify each subsequent frame of the plurality of frames until a last frame in the sequence is reached, by the computing system. Additionally, the computer-implemented method includes appending the UID to the hash to indicate for the last frame that it is indeed the last frame and the sequence loops back to the first frame, by the computing system.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to an architecture and process that encodes information into a cellular automata memory structure such that it can be recalled utilizing unique memory anchors (engrams) in a manner that both identifies and relates each piece of information relative to other data points. The automata of some embodiments are individually programmable with a limited, local ruleset that activates other cellular automata based on prior patterns that were fed into the array. In some embodiments, the process generally works as follows. Data recall occurs through pattern learning and recognition. Data is decomposed into temporal frames to be encoded in the memory structure. Memory prediction is fed back into the memory structure to reconstruct the next frame of data. Constrained rules in each cellular automaton concatenate data. Such embodiments allow probing of DLNN systems to understand what discriminators are being used to classify the data. In other words, it is possible to see how the computing system is making its "decisions." This is not possible with conventional DLNN techniques.

For memory patterns that have decomposed frames with no data, it can be challenging to accurately recall complex images. These memory structures are then stabilized using a unique memory hash that is generated from a unique identifier (ID). More specifically, due to software limitations in some embodiments, all data must be represented as either a "1" or a "0". The original image is split into multiple frames (e.g., an a, h, v, d decomposition from a two-dimensional (2D) wavelet transform), and these frames, in turn, are decomposed. However, some of the decomposed frames may not have data when decomposed to 1s and 0s.

These "empty" frames themselves, however, do contain information. The fact that they are empty in and of itself means they have data. However, if left as just an empty frame alone, if there were ten empty frames, for instance, the cellular automata would not be able to accurately discern which frames are actually related. As such, it would continually generate empty frames, halting recall of the frame sequence. This provides an amalgamation that is not useful. Some embodiments avoid this problem by using a hash of unique numbers that are assigned to each frame. For instance, where six numbers that are between 1-100 are used, collisions between empty frames are highly unlikely.

The unique ID creates a unique sequence that enables memory to recall all data, including empty frames. The memory hashes are created using unsupervised machine learning techniques, such as principal component analysis, linear discriminant analysis, or any other suitable technique without deviating from the scope of the invention. Relative memory hashes enable navigation in pattern space for creative actions.

Some embodiments could be used for various purposes. For instance, certain embodiments may predict weather, predict motion of objects without knowing the underlying physics (for instance, some embodiments may predict the path of a ball based on learning from images of a previous ball), improvise jazz music, write novels, etc. In the case of predicting weather, cyclical patterns in cloud cover, for instance, may be predicted. Based on learned patterns, the system may generate new patterns from images of a weather system.

Figure 1:
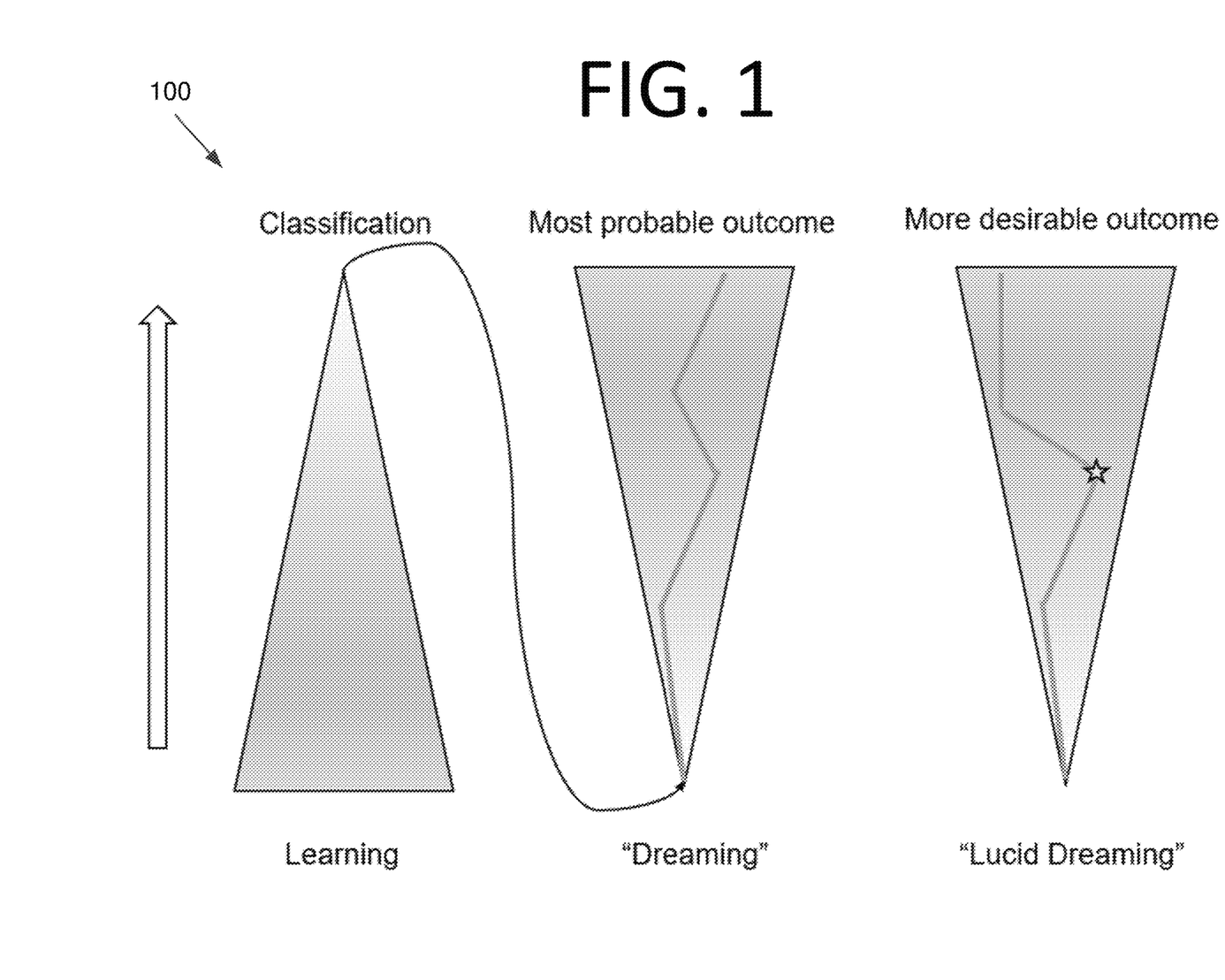
FIG. 1 illustrates a progression from learning to "dreaming" and "lucid dreaming," according to an embodiment of the present invention.

FIG. 1 illustrates a progression 100 from learning to "dreaming" and "lucid dreaming," according to an embodiment of the present invention. The system is first trained how to make classifications. On that basis, the system performs a "dreaming" step that starts with a classification and yields a most probable outcome. Allows the system to engage in "lucid dreaming," where more desirable possibilities, and the paths to get there, are revealed and implemented.

This progression can be described when modeling a Galton bean box experiment having three stages. The learning (first) stage is characterized with the system learning the individual paths of the Galton box. The second stage involves generating never before seen scenarios based on these paths, the sum of which can be statistically verified to be a normal distribution. The third stage involves the system being used to help identify the individual paths to create a new, more desirable distribution (i.e., bimodal, skewed, etc.). An embodiment was trained to accurately simulate the Galton bean box experiment. Interestingly, the software was able to recreate the Galton box based on images alone, without knowledge of the underlying physics or mathematics. Embodiments may also be able to accurately simulate and provide effective strategy for games, such as rock, paper, scissors. These embodiments would likely be translatable to other more complex applications of game theory, including, but not limited to, high stakes negotiations where low probability, win-win solutions can be found.

Cellular automata are computer modeling techniques used to model systems in which space and time are discrete, and quantities take on a finite set of discrete values. Cellular automata were originally introduced in the sixties by von Neumann and Ulan as a model of a biological self-reproduction. They wanted to know if it would be possible for an abstract machine to reproduce—that is, to automatically construct a copy of itself.

Their model consisted of a two-dimensional grid of cells, each cell of which had a number of states, representing the components out of which they built the self-reproducing machine. Controlled completely by a set of rules designed by its creators, the machine would extend an arm into a new portion of the grid, then slowly scan it back and forth, creating a copy of itself—thus reproducing the patterns of cells at another location in the grid.

Since then, cellular automata have been repeatedly reintroduced and applied to a considerable variety of purposes. In general, cellular automata are implemented as a regular array or matrix of variables called "cells." Each cell may assume values from a finite set of integers and each value is normally associated with a color.

Storage of Data

Hierarchical temporal memory (HTM) data structures based on neuroscience and the physiology and interaction of pyramidal neurons in the neocortex of the human brain have been used to store data. However, these HTM data structures, such as that utilized by Numenta®, make storage of grayscale images challenging. Though the HTM memory structures are ordered in a manner to best process visual data, it was found that their implementations could not perform visual classification that standard DLNN systems have mastered. Images contain data rich features, and therefore, play well into non-temporal based DLNN techniques. Pattern-based learning techniques are therefore both overwhelmed by the amount of instantaneous data and starved for a lack of temporal patterns.

It should be noted that while Numenta® is currently the best available system to demonstrate the recall sequence, memory hash, UIDs, etc., it is merely used as a demonstration platform as discussed herein. The memory recall, memory hash, UIDs, cellular automata, and various methods discussed herein are novel. Indeed, the array of cellular automata of some embodiments is much more flexible and powerful in handling the specific implementation discussed herein.

Accordingly, some embodiments utilize the pattern learning aspect from temporal memories (TMs) to break data down into more manageable frames of information. Two-dimensional (2D) wavelet transforms may be used to reduce an image dataset into smaller datasets, at the cost of more frames. More specifically, an a, h, v, d decomposition of a 512×512 image is reduced to four respective 256×256 frames. However, any number and size of decompositions may be used without deviating from the scope of the invention. Wavelets identify general features (color, gross shape, etc.), and provide decompositions that are both positive and negative.

The frame sequence is fed into the system twice such that the pattern is self-regenerating and repeating. Since the cellular automata structure memorizes patterns, it is important to loop a memory pattern back onto itself so that any memory structure will then recall a copy of itself, making the memory engram self-reinforcing. For instance, for five patterns 1, 2, 3, 4, 5, the pattern twice through would be 1, 2, 3, 4, 5, 1, 2, 3, 4, 5. By repeating the pattern in this manner, the system learns that pattern 5 links back to pattern 1, and the structure then loops infinitely during a recall event.

A limited number of connections between neurons and forgetting of rare data points enables memory consolidation. Limiting the number of connections or codependent rules between cellular automata cells enables consolidation of ideas. Without consolidation, a perfect recall of information is possible. However, with perfect recall, creative thought may not be possible. With imperfect recall, on the other hand, the creation of new ideas and thoughts is possible. In some embodiments, it has been found that less than 20 possible rules per cellular automaton enables the best recall and new pattern generation.

Recall of Data

With a single data frame, TM predicts the next frame to be activated. With multiple choices, in some embodiments, all of the possible frames are activated. With subsequent frame data, the possible activated "neurons" pare down until only the patterns of interest are recalled. This occurs in the search phase, where the system may be trained by going one time through the data or any desired number of iterations without deviating from the scope of the invention.

In the recall phase, the system is in the second sequence, which by then is locked into the pattern. The predictions are utilized as the actual activated neurons, and that data is used to predict the next frame. More specifically, the predicted frame is inserted into the actual frame, and data in the frame can be recovered and reconstructed. A problem is that for any decomposition with quantization, frames will be inserted that have no data. The memory recall algorithm does not know where it is when there is no data in the frame. In the case of images, a 2D wavelet decomposed into individual frames is fed into the array serially and learned as next steps. The decomposed image pattern may then be repeated, enabling the cellular automata to learn a self-reinforcing pattern.

Figure 2:
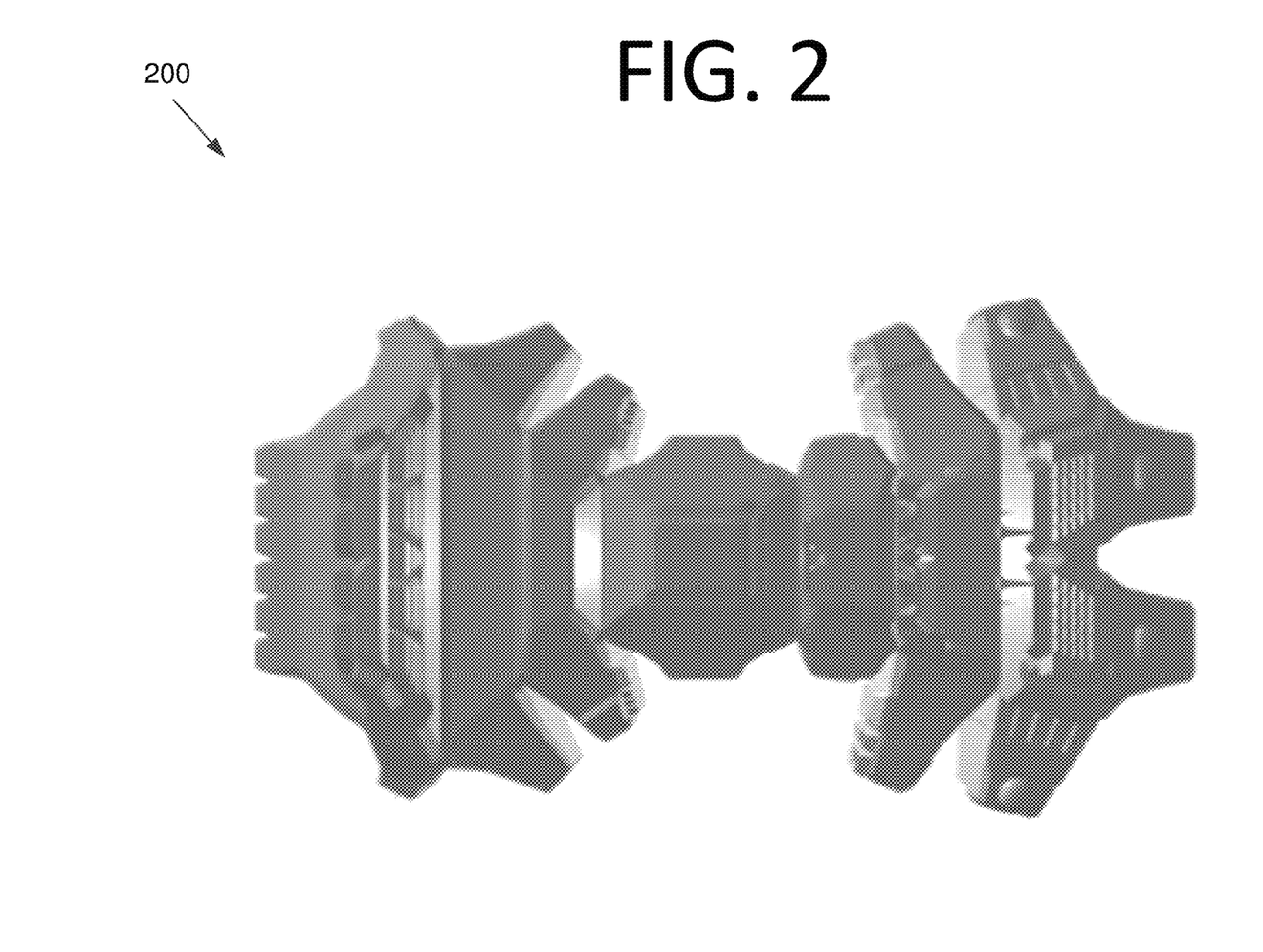
FIG. 2 illustrates an example image to be processed and reconstructed, as seen by a wavelet preprocessor, according to an embodiment of the present invention.
Figure 3A:
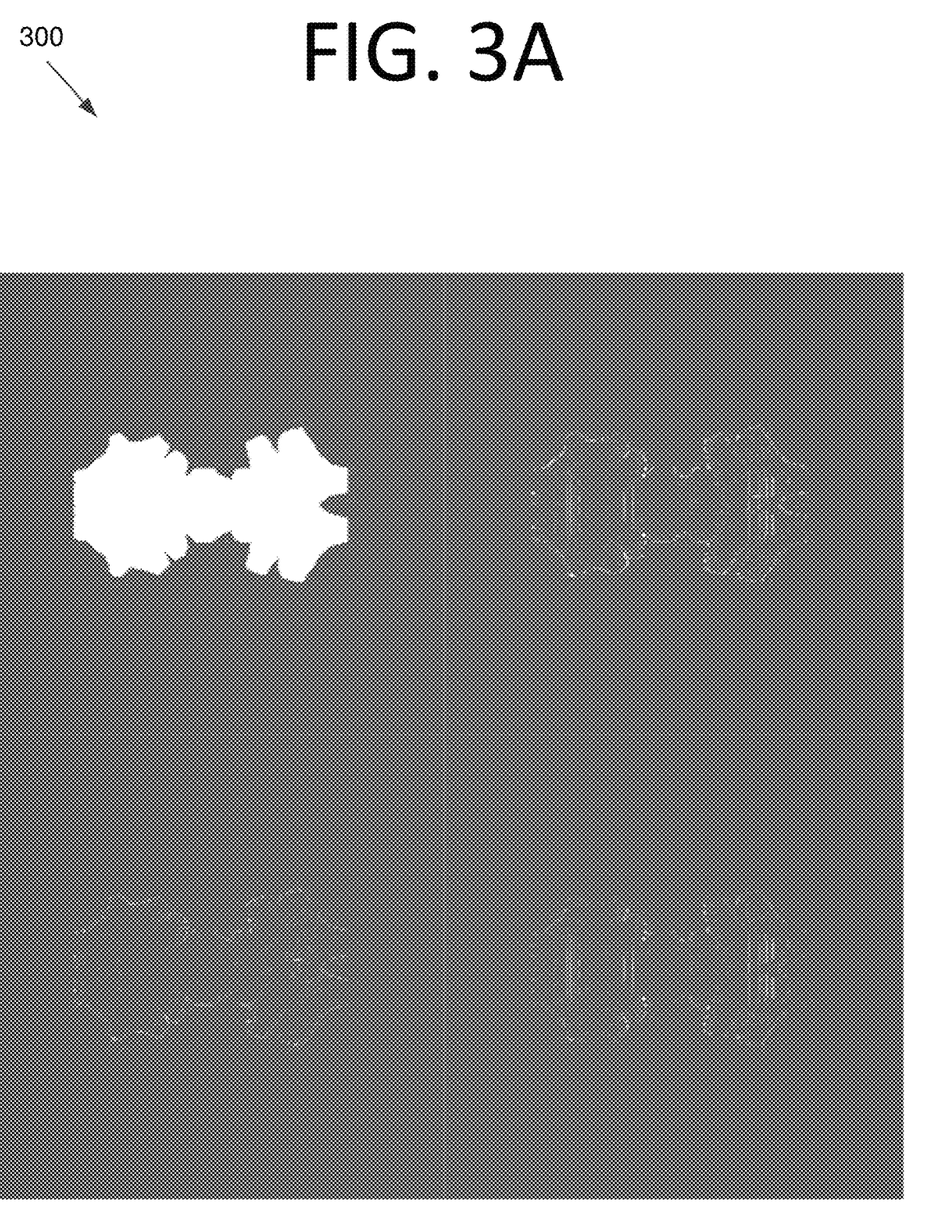
FIG. 3A illustrates a level 1 image decomposition 300 of image 200 that includes four 256×256 images that correspond to a, h, v, d decompositions, according to an embodiment of the present invention.

An example image 200 to be processed and reconstructed, as seen by a wavelet preprocessor, is shown in FIG. 2. Image 200 is a 512×512 grayscale image, and all of the data to be processed is included in image 200. Grayscale may be used so all data may be broken down into a binary representation of 1s and 0s. FIG. 3A illustrates a level 1 image decomposition 300 of image 200 that includes four 256×256 images that correspond to a, h, v, d decompositions.

Figure 3B:
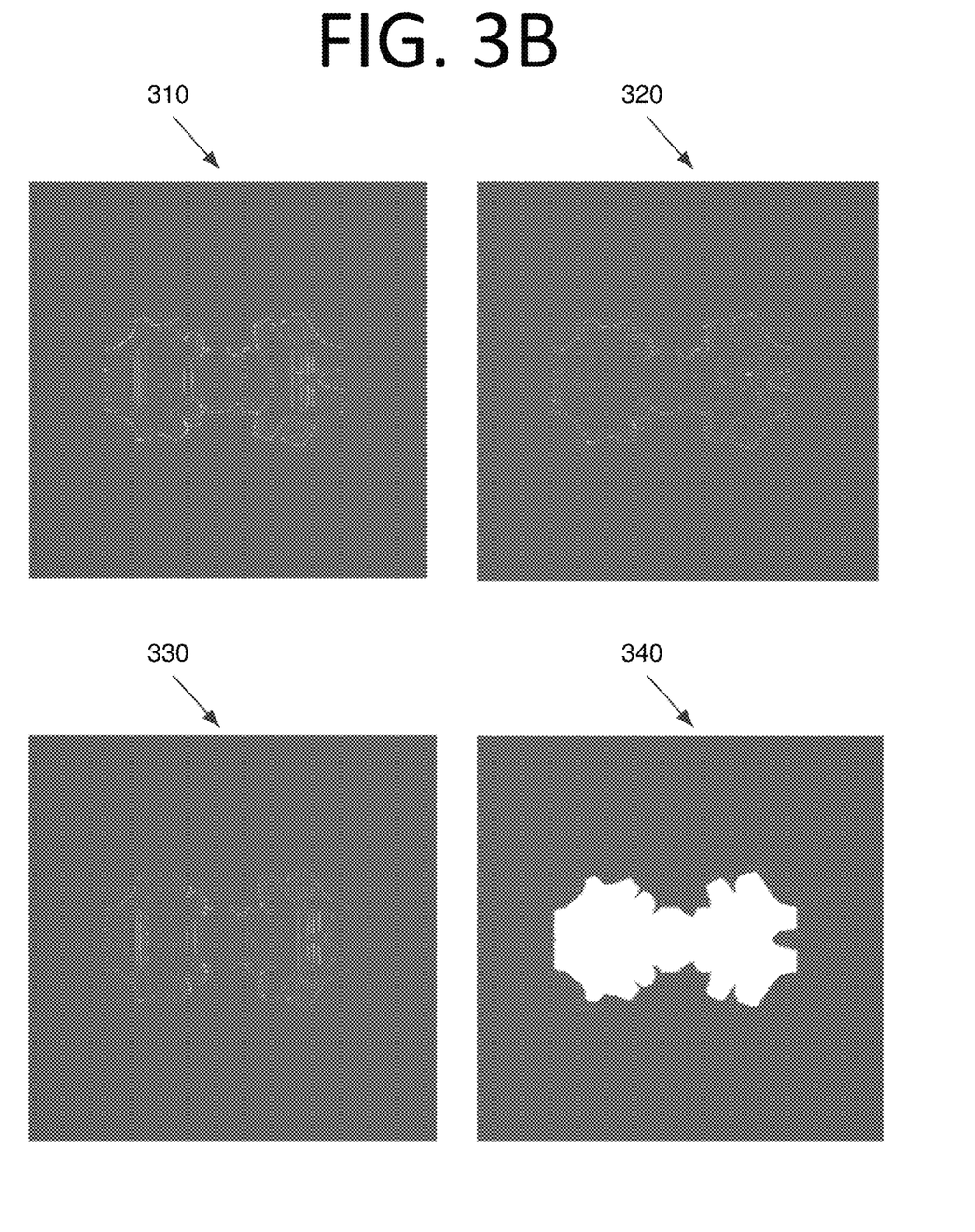
FIG. 3B illustrates respective h, v, d, a image decomposition frames, according to an embodiment of the present invention.

FIG. 3B illustrates respective h, v, d, a image decomposition frames 310, 320, 330, 340, according to an embodiment of the present invention. Frame 310 predicts frame 320, frame 320 predicts frame 330, frame 330 predicts frame 340, and frame 340 predicts frame 310. In this manner, the frame prediction is self-repeating and all frames can be predicted from any given starting frame. The cellular automata will regenerate the pattern order. Also, this configuration enables multiple datasets to be learned by the same memory array. This "stack" of frames of binary data fully describe the image dataset. In some embodiments, best practices have found that feeding the sparse details frames first, building towards the coarse approximation leads to the most stable memory patterns.

Memory Engram

In some embodiments, in order to keep memory recall "locked" during frames with little or no data for pattern recall and image reconstruction, a unique hash generated from a unique ID (UID) is utilized. In some embodiments, the "hash" can be from an unsupervised classification mechanism. For instance, in certain embodiments, wavelet decomposition and a discrete cosine transform (DCT) are used as feeds into a principal component analysis (PCA) to create a unique hash of bins of six numbers from 1-100 that is used to identify the image in question relative to other images. The number 0 is avoided in some embodiments because this may indicate that any frame is possible.

Principal component analysis (PCA) is a statistical procedure that uses an orthogonal transformation to convert a set of observations of possibly correlated variables into a set of values of linearly uncorrelated variables called principal components (or sometimes, principal modes of variation). The number of principal components is less than or equal to the smaller of the number of original variables or the number of observations. This transformation is defined in such a way that the first principal component has the largest possible variance (that is, accounts for as much of the variability in the data as possible), and each succeeding component in turn has the highest variance possible under the constraint that it is orthogonal to the preceding components. The resulting vectors are an uncorrelated orthogonal basis set. PCA is sensitive to the relative scaling of the original variables.

The process in some embodiments is as follows. An an image is fed into a PCA algorithm. This PCA algorithm finds the first three highest orthogonal axes of maximal difference (i.e., the first three resulting vectors) for the 2D wavelet transform of the image (spatial and edge effects) and the DCT of the image (frequency effects, only positive numbers), which are each normalized to generate an integer number between 1 and 100. Thus, these six axes of "uniqueness" are all scaled from 1-100.

The range of numbers in the PCA can only vary 1 and 100 in this embodiment. Most numbers will be around 50 since PCA normalizes and flattens out whatever space it is given, which could be visualized as a round "blob". There may be wings out to as far as 100 based on the sigma points. However, it is unlikely to have numbers close to 1 or 100 due to the normalization. For instance, the one sigma point range in this embodiment would be approximately the middle third of the distribution (i.e., numbers between approximately 33 and 66). This may be visually approximated by a bell curve.

It should be noted that any range of numbers may be used without deviating from the scope of the invention, depending on the quantization. However, having at least some collisions is desirable in order to avoid perfect recall. As such, values may be rounded to full digits such that collisions may occur. These collisions provide branching points, and the range may be selected to achieve the desired amount of variability. In other words, collisions mean that frames are "similar". For instance, with a range of 1-10, many frames will look the same. However, with a range of 1-10,000, most frames will not look the same. It is theorized that collisions between 1-5% would create variations that are not the same, but are still similar (e.g., creating an extra arm off a star-shaped object).

The UID is then used as a random seed to generate subsequent memory frame hashes to produce a memory sequence that is added to the frame data to be learned. Using this approach, a UID of 6 numbers between 1-100 will have nearly one trillion possible combinations. As such, the UID sequence will be unique for the data. Playback of the UID sequence is sufficient to recall the entire data frame necessary for reconstruction.

Figure 4:
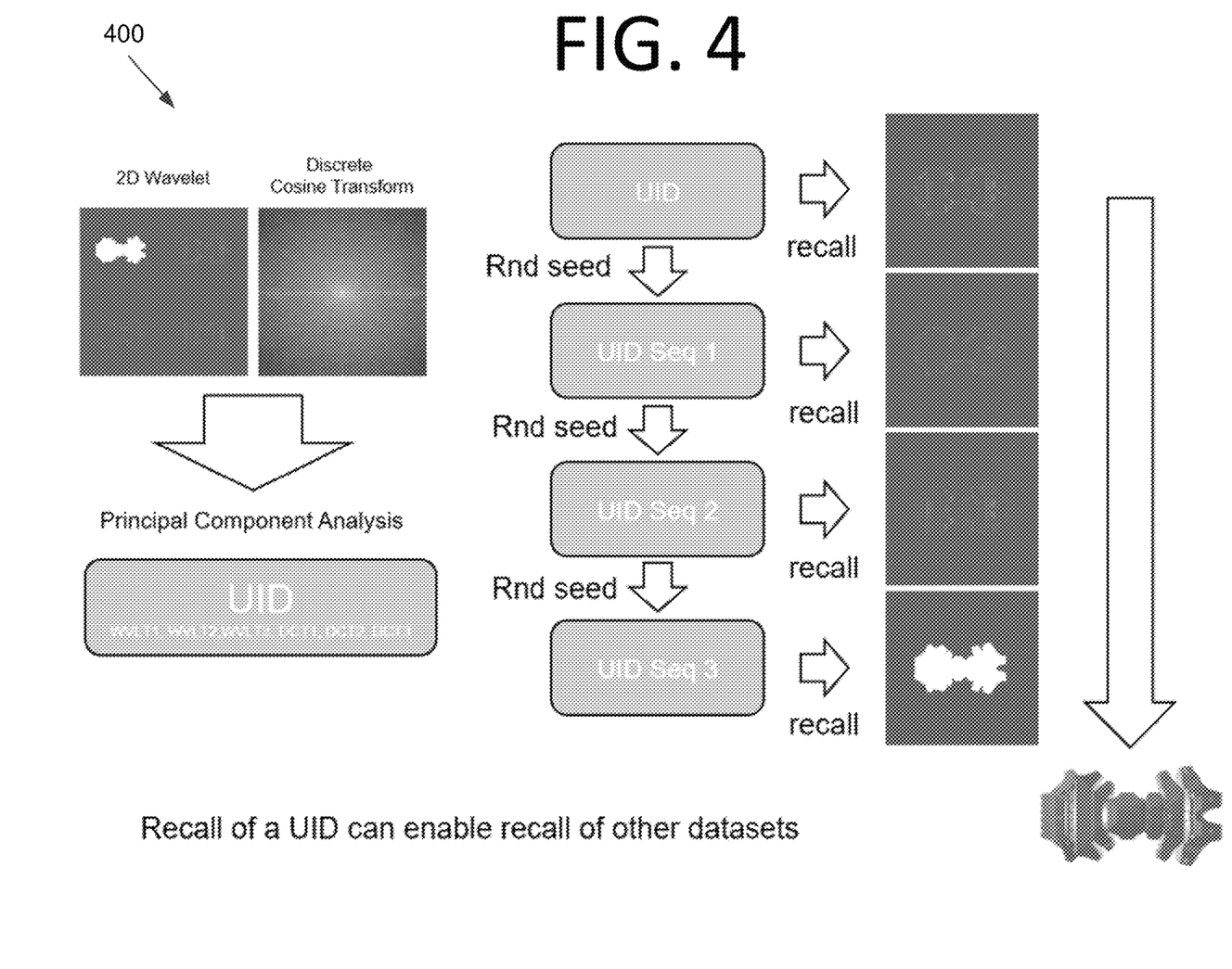
FIG. 4 illustrates a general process for developing unique UIDs that enable recall of other datasets, according to an embodiment of the present invention.

FIG. 4 illustrates a general process 400 for developing unique UIDs that enable recall of other datasets, according to an embodiment of the present invention. A 2D wavelet transform and a DCT are performed on an image, PCA is performed, and the three most orthogonal axes for each of the 2D wavelet and the DCT are normalized to yield a 6 number UID. More specifically, the first three principal components of the 2D wavelet transform of the data (WVLT1, WVLT2, WVLT3) and the first three principal components of the DCT of the data (DCT1, DCT2, DCT3) were used to create a six number UID, as discussed above. This UID can be hashed by using it as a seed for a random number generator that will generate a unique pattern including the memory engram.

In other words, once the UID is used as a seed for a random number generator, six more digits from 1-100 are provided that are not normalized. This produces columns of UIDs, and the subsequent number-generated UIDs may be used to lock in the sequence. Each cellular automaton is a pixel, and the UID is the memory engram that locks in the frame, especially if there is no data in a frame. Each hash is the height of the number of frames, and is appended to its respective frame. Pixels may have values from 0-255 in some color embodiments, where grayscale is used, e.g., 0-255, some frames will be zeroed out.

The UID in this embodiment will recall frame 310. The UID is then used as a random seed to generate a second UID (UID2) that recalls frame 320 (sequence now includes UID and UID2), to generate a third UID (UID3) that recalls frame 330 (sequence now includes UID, UID2, and UID3), and to generate a fourth UID (UID4) that recalls frame 340 (sequence now includes UID, UID2, UID3, and UID4).

In order for the last frame to recall the first frame, in some embodiments, the hash is generated through the initial UID, and no more hashes are generated after the last unique frame is reached. The sequence X with the UID hash sequence appended is then fed it into memory twice (i.e., X, then X again), creating a repeating structure. Given that UID2, UID3, and UID4 are six random numbers between 1 and 100, the chance of collisions with other UIDS is very low.

Abstraction and Imperfect Recall

Multiple datasets are fed into the cellular automata array in some embodiments, enabling a multitude of possible outcomes within the array. Cellular automata can learn cell-specific rules through feed forward propagation techniques used by HTM software. Individual memories can be added by learning the first memory sequence, then inserting the second one. By limiting the number of rules, abstraction and optimization of the data (imperfect recall) can result in new datasets to be recalled.

Rules are defined such that each cellular automaton undergoes certain behaviors based on what is around it (e.g., a cellular automaton may look at 8 pixels around it to determine what it will do next). While every cellular automaton in the game of life, for instance, has the same rule, cellular automata in some embodiments may each have their own rules, or sets of cellular automata may have the same rules, and rules may differ among sets. For instance, what causes a cell to act could be 5-6 cells away. What rules are provided is a choice that the developer makes in order to teach the cellular automata to perform certain behaviors. This is feed-forward neural network training which looks forward and knows that if other cells are active, a given cell will be active next frame. In other words, based on where a cellular automaton finds itself in a sequence, it will perform some action based on its rules. A smaller number of rules provide imperfect recall and dreaming behavior. The fewer rules the cell is given, the more ability the cell has to concatenate information (i.e., reducing recall such that perfect recall is not possible).

Since the PCA algorithm of some embodiments takes six orthogonal numbers (3 wavelet, 3 DCT) and normalizes and quantizes them into a number from 1-100, images may be similar enough that the PCA process will assign similar, or even identical, UIDs. These UIDs will create the same memory hash (UID2, UID3, and UID4) and will combine similar ideas into an amalgamated memory.

The combination of these three approaches (generating cellular automata that regenerate the initial dataset, generating new images by putting multiple stacks of data in the same array, and constraining the ruleset) enables the system to learn a temporal dataset that has a search and recall phase. By injecting random information during the search and recall phases, the system be enhanced to create new outcomes thorough stochastic resonance. Similar UIDs differing by one digit, for example, can be accessed through these stochastic techniques.

Figure 5A:
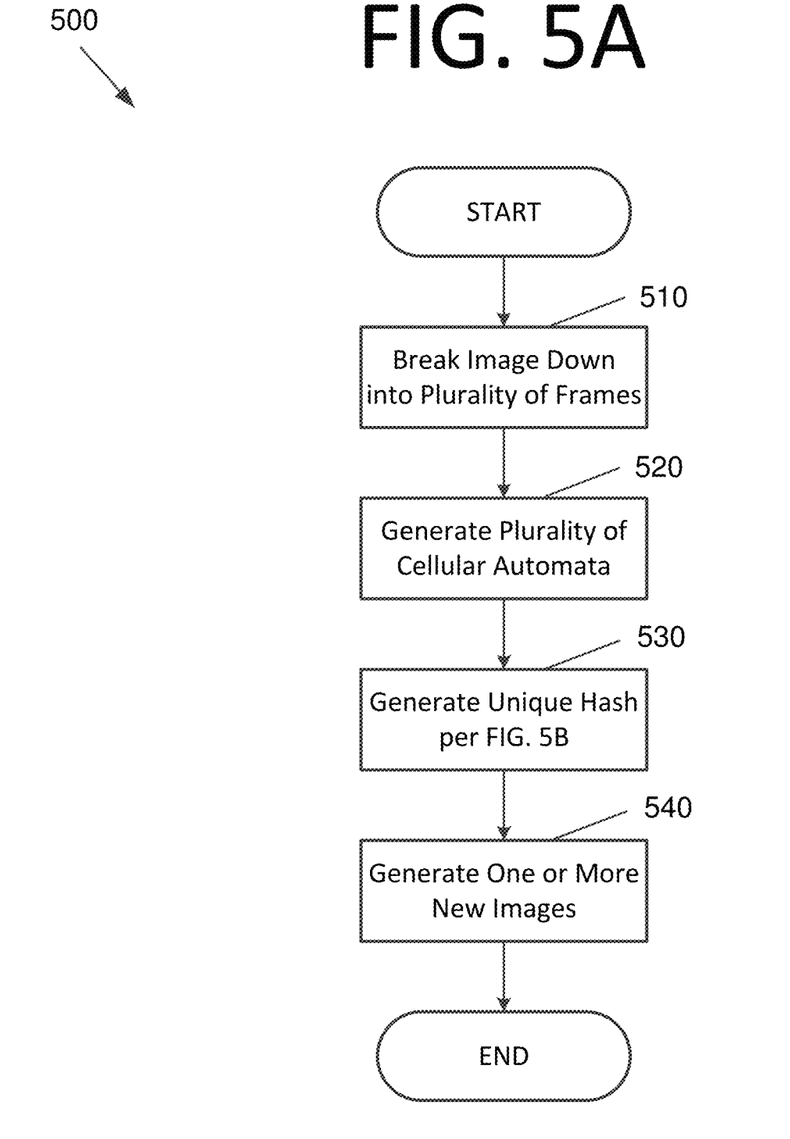
FIG. 5A is a flowchart illustrating a process for performing memory recall and improvisation, according to an embodiment of the present invention.

FIG. 5A is a flowchart 500 illustrating a process for performing memory recall and improvisation, according to an embodiment of the present invention. The process begins with breaking an image down into a plurality of frames using a two-dimensional (2D) wavelet transform at 505, thereby reducing data of the image into a plurality of smaller datasets associated with the plurality of frames. Then, a plurality of cellular automata are generated that regenerate an initial dataset at 510 by feeding the plurality of frames through the plurality of cellular automata twice in a sequence. In some embodiments, each cellular automaton is individually programmed with a limited, local ruleset incapable of perfect recall that activates other cellular automata of the plurality of cellular automata based on prior patterns that were fed into the array, thereby enabling the imperfect recall. In certain embodiments, the limited local ruleset of each cellular automaton includes less than 20 rules.

A unique hash for the image is then generated at 530. See FIG. 5B. In some embodiments, this process includes identifying a first frame in the sequence of the plurality of frames using the UID at 531. If there are more frames in the sequence at 532, the UID is used as a seed to generate a random number for the current frame in the sequence at 533, and the random number is appended to the UID in the hash to identify the current frame of the plurality of frames at 534. If there are not more frames in the sequence at 531, the last frame in the sequence has been reached and the UID is appended to the hash at 535 to indicate for the last frame that it is indeed the last frame and the sequence loops back to the first frame.

Figure 5B:
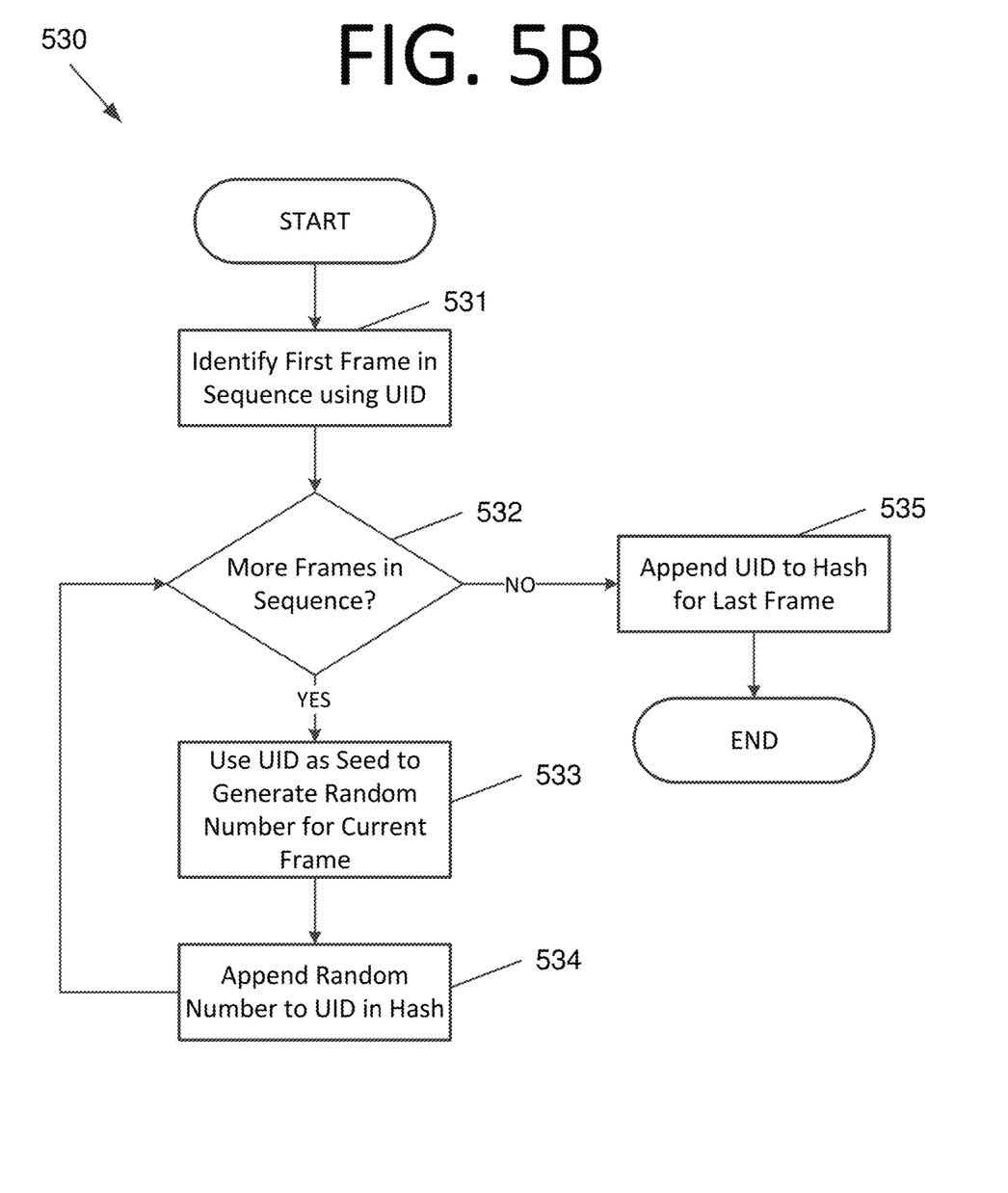
FIG. 5B is a flowchart illustrating a process for generating a unique hash for an image, according to an embodiment of the present invention.

In some embodiments, the UID is derived from performing PCA on a 2D wavelet transform and a DCT of the image, normalizing three most orthogonal axes for each of the 2D wavelet transform and the DCT into positive integers within a predetermined range. In certain embodiments, the unique hash includes bins of six numbers used to identify the image relative to other images. In some embodiments, the depth of the unique hash is equal to the number of frames in the plurality of frames. In certain embodiments, each number is in a range from 1 to 100. In some embodiments, the range of each number of the six numbers is selected to cause collisions in a range of 1% to 5%.

Once the unique hash is generated, one or more new images are generated at 540 by putting multiple stacks of frames for multiple images in a same array due to imperfect recall. Since the cellular automata may be configured to have insufficient rules to enable perfect recall, but also have a probability of collisions between 1% and 5%, the system can somewhat vary an image to produce a new image that is similar to, but different from, the original image.

Figure 6:
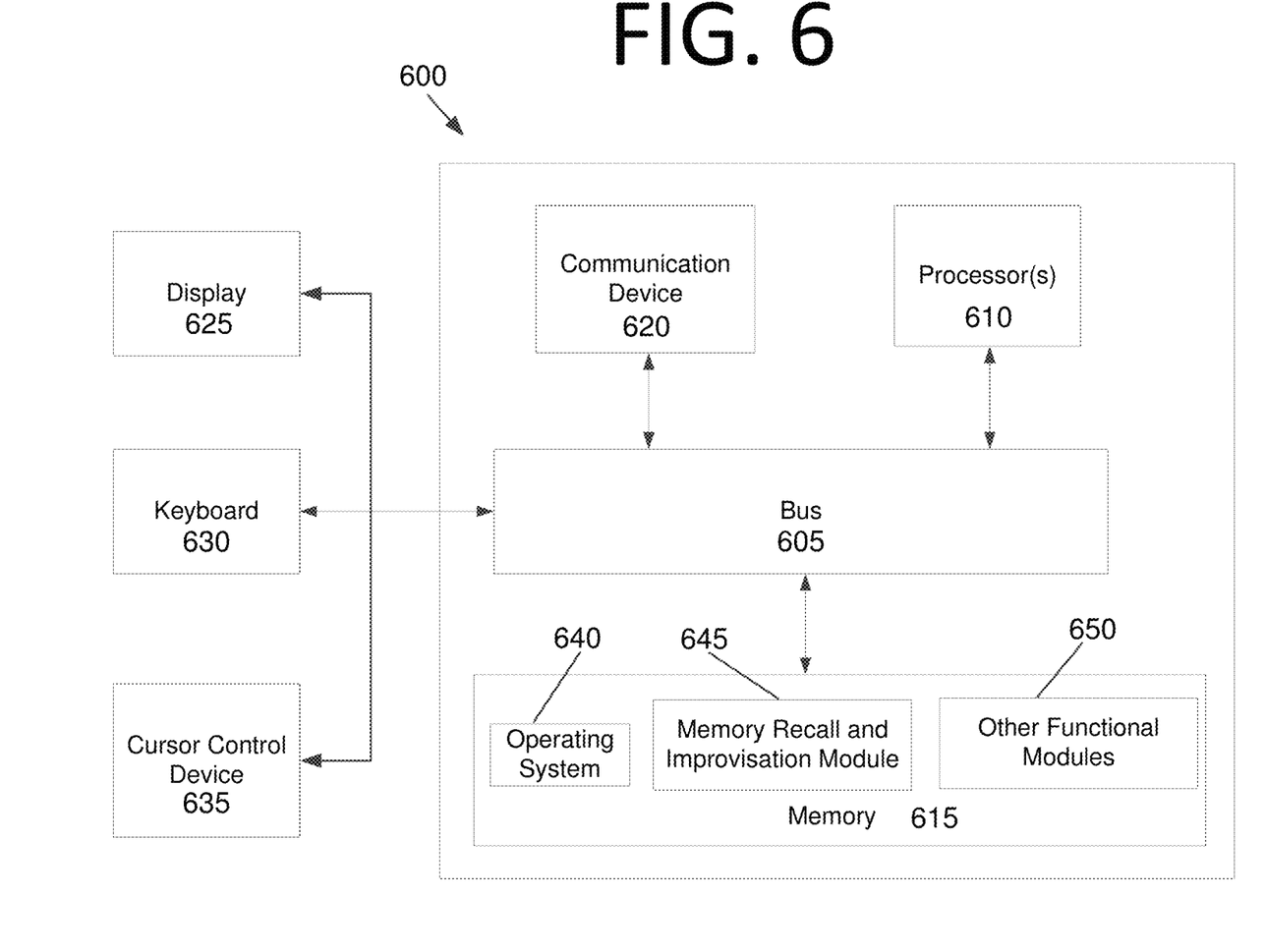
FIG. 6 illustrates a computing system configured to perform memory recall and improvisation, according to an embodiment of the present invention.

FIG. 6 illustrates a computing system 600 configured to perform memory recall and improvisation, according to an embodiment of the present invention. System 600 includes a bus 605 or other communication mechanism for communicating information, and processor(s) 610 coupled to bus 605 for processing information. Processor(s) 610 may be any type of general or specific purpose processor, including a central processing unit (CPU) or application specific integrated circuit (ASIC). Processor(s) 610 may also have multiple processing cores, and at least some of the cores may be configured for specific functions. System 600 further includes a memory 615 for storing information and instructions to be executed by processor(s) 610. Memory 615 can be comprised of any combination of random access memory (RAM), read only memory (ROM), flash memory, cache, static storage such as a magnetic or optical disk, or any other types of non-transitory computer-readable media or combinations thereof. Additionally, system 600 includes a communication device 620, such as a transceiver, to wirelessly provide access to a communications network. Communication device 620 may receive a signal including the SDI and interference/noise.

Non-transitory computer-readable media may be any available media that can be accessed by processor(s) 610 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 610 are further coupled via bus 605 to a display 625, such as a Liquid Crystal Display (LCD), for displaying information to a user. A keyboard 630 and a cursor control device 635, such as a computer mouse, are further coupled to bus 605 to enable a user to interface with system 600. However, in certain embodiments such as those for mobile computing implementations, a physical keyboard and mouse may not be present, and the user may interact with the device solely through display 625 and/or a touchpad (not shown). Any type and combination of input devices may be used as a matter of design choice.

In one embodiment, memory 615 stores software modules that provide functionality when executed by processor(s) 610. The modules include an operating system 640 for system 600. The modules further include a memory recall and improvisation module 645 that is configured to configured to perform the various machine learning, memory recall, and improvisation processes discussed herein. System 600 may include one or more additional functional modules 650 that include additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 5A and 5B may be performed by a computer program, encoding instructions for the nonlinear adaptive processor to perform at least the process described in FIGS. 5A and 5B, in accordance with embodiments of the present invention. The computer program may be embodied on a non-transitory computer-readable medium. The computer-readable medium may be, but is not limited to, a hard disk drive, a flash device, RAM, a tape, or any other such medium used to store data. The computer program may include encoded instructions for controlling the nonlinear adaptive processor to implement the process described in FIGS. 5A and 5B, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general-purpose computer, or an ASIC.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program embodied on a non-transitory computer-readable medium, the program configured to cause at least one processor to:
   break an image down into a plurality of frames using a two-dimensional (2D) wavelet transform, thereby reducing data of the image into a plurality of smaller datasets associated with the plurality of frames;
   generate a plurality of cellular automata that regenerate an initial dataset by feeding the plurality of frames through the plurality of cellular automata twice in a sequence;
   generate a unique hash for the image; and
   generate one or more new images by putting multiple stacks of frames for multiple images in a same array due to imperfect recall via the unique hash, wherein
   each cellular automaton of the plurality of cellular automata is individually programmed with a limited, local ruleset that is a subset of a complete ruleset and is incapable of perfect recall, and
   the limited, local ruleset activates other cellular automata of the plurality of cellular automata based on prior patterns that were fed into the array, thereby enabling the imperfect recall.

2. The computer program of claim 1, wherein the limited local ruleset of each cellular automaton comprises less than 20 rules.

3. The computer program of claim 1, wherein the unique hash comprises bins of six numbers used to identify the image relative to other images.

4. The computer program of claim 3, wherein a depth of the unique hash is equal to a number of frames in the plurality of frames.

5. The computer program of claim 3, wherein each number is in a range from 1 to 100.

6. The computer program of claim 3, wherein a range of each number of the six numbers is selected to cause collisions in a range of 1% to 5%.

7. The computer program of claim 1, wherein the generating of the unique hash comprises:
   generating a unique ID (UID) for the image.

8. The computer program of claim 7, wherein the UID is derived from performing principal component analysis (PCA) on a 2D wavelet transform and a discrete cosine transform (DCT) of the image, normalizing three most orthogonal axes for each of the 2D wavelet transform and the DCT into positive integers within a predetermined range.

9. The computer program of claim 7, wherein the generating of the unique hash comprises:
   identifying a first frame in the sequence of the plurality of frames using the UID;
   using the UID as a seed to generate a random number for a second frame in the sequence;
   appending the random number to the UID in the hash to identify the second frame of the plurality of frames;
   repeating the generation of new random numbers using the UID as a seed and appending of the new random number to the hash to identify each subsequent frame of the plurality of frames until a last frame in the sequence is reached; and
   appending the UID to the hash to indicate for the last frame that it is indeed the last frame and the sequence loops back to the first frame.

10. A computer-implemented method, comprising:
    generating a plurality of cellular automata, by a computing system, that regenerate an initial dataset by feeding a plurality of frames derived from an image through the plurality of cellular automata twice in a sequence; and generating, by the computing system, a unique hash for the image, wherein
each cellular automaton of the plurality of cellular automata is individually programmed with a limited, local ruleset that is a subset of a complete ruleset and is incapable of perfect recall, and
the limited, local ruleset activates other cellular automata of the plurality of cellular automata based on prior patterns that were fed into the array, thereby enabling the imperfect recall.

11. The computer-implemented method of claim 10, wherein the limited local ruleset of each cellular automaton comprises less than 20 rules.

12. The computer-implemented method of claim 10, wherein the unique hash comprises bins of six numbers used to identify the image relative to other images.

13. The computer-implemented method of claim 12, wherein a depth of the unique hash is equal to a number of frames in the plurality of frames.

14. The computer-implemented method of claim 12, wherein each number is in a range from 1 to 100.

15. The computer-implemented method of claim 12, wherein a range of each number of the six numbers is selected to cause collisions in a range of 1% to 5%.

16. The computer-implemented method of claim 10, wherein the generating of the unique hash comprises:
generating a unique ID (UID) for the image, by the computing system.

17. The computer-implemented method of claim 16, wherein the UID is derived from performing principal component analysis (PCA) on a 2D wavelet transform and a discrete cosine transform (DCT) of the image, normalizing three most orthogonal axes for each of the 2D wavelet transform and the DCT into positive integers within a predetermined range.

18. The computer-implemented method of claim 16, wherein the generating of the unique hash comprises:
identifying a first frame in the sequence of the plurality of frames using the UID, by the computing system;
using the UID as a seed to generate a random number for a second frame in the sequence, by the computing system;
appending the random number to the UID in the hash to identify the second frame of the plurality of frames, by the computing system;
repeating the generation of new random numbers using the UID as a seed and appending of the new random number to the hash to identify each subsequent frame of the plurality of frames until a last frame in the sequence is reached, by the computing system; and
appending the UID to the hash to indicate for the last frame that it is indeed the last frame and the sequence loops back to the first frame, by the computing system.

19. A computer-implemented method, comprising:
generating a unique hash for an image, by a computing system; and
generating one or more new images, by the computing system, by putting multiple stacks of frames for multiple images in a same array due to imperfect recall via the unique hash, wherein
each cellular automaton of the plurality of cellular automata is individually programmed with a limited, local ruleset that is a subset of a complete ruleset and is incapable of perfect recall, and
the limited, local ruleset activates other cellular automata of the plurality of cellular automata based on prior patterns that were fed into the array, thereby enabling the imperfect recall.

20. The computer-implemented method of claim 19, wherein the unique hash comprises bins of six numbers used to identify the image relative to other images.

21. The computer-implemented method of claim 19, wherein a depth of the unique hash is equal to a number of frames in the plurality of frames.

22. The computer-implemented method of claim 19, wherein each number is in a range from 1 to 100.

23. The computer-implemented method of claim 19, wherein a range of each number of the six numbers is selected to cause collisions in a range of 1% to 5%.

24. The computer-implemented method of claim 19, wherein the generating of the unique hash comprises:
generating a unique ID (UID) for the image, by the computing system.

25. The computer-implemented method of claim 24, wherein the UID is derived from performing principal component analysis (PCA) on a 2D wavelet transform and a discrete cosine transform (DCT) of the image, normalizing three most orthogonal axes for each of the 2D wavelet transform and the DCT into positive integers within a predetermined range.

26. The computer-implemented method of claim 24, wherein the generating of the unique hash comprises:
identifying a first frame in the sequence of the plurality of frames using the UID, by the computing system;
using the UID as a seed to generate a random number for a second frame in the sequence, by the computing system;
appending the random number to the UID in the hash to identify the second frame of the plurality of frames, by the computing system;
repeating the generation of new random numbers using the UID as a seed and appending of the new random number to the hash to identify each subsequent frame of the plurality of frames until a last frame in the sequence is reached, by the computing system; and
appending the UID to the hash to indicate for the last frame that it is indeed the last frame and the sequence loops back to the first frame, by the computing system.

* * * * *